(12) United States Patent
Kim et al.

(10) Patent No.: US 9,134,594 B2
(45) Date of Patent: Sep. 15, 2015

(54) PROJECTION DEVICE MANAGEMENT SYSTEM

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD, Seoul (KR)

( * ) Notice: Subject to any disclaimer, the term of this patent is extended or adjusted under 35 U.S.C. 154(b) by 194 days.

(21) Appl. No.: 13/934,983

(22) Filed: Jul. 3, 2013

(65) Prior Publication Data
US 2014/0016101 A1    Jan. 16, 2014

(30) Foreign Application Priority Data

Jul. 12, 2012  (KR) .................. 10-2012-0076100
Nov. 16, 2012  (KR) .................. 10-2012-0130111

(51) Int. Cl.
| | |
|---|---|
| G03B 21/26 | (2006.01) |
| G03B 37/04 | (2006.01) |
| H04N 9/31 | (2006.01) |
| G03B 21/16 | (2006.01) |
| G03B 21/14 | (2006.01) |
| E04H 3/22 | (2006.01) |
| G03B 21/20 | (2006.01) |
| G03B 21/56 | (2006.01) |

(52) U.S. Cl.
CPC  *G03B 21/16* (2013.01); *E04H 3/22* (2013.01); *G03B 21/14* (2013.01); *G03B 21/206* (2013.01); *H04N 9/3147* (2013.01); *H04N 9/3182* (2013.01); *H04N 9/3194* (2013.01); *G03B 21/56* (2013.01); *G03B 37/04* (2013.01)

(58) Field of Classification Search
CPC ........ G03B 21/26; G03B 37/04; G03B 21/56; G03B 21/003; H04N 9/3147; H04N 9/3185
USPC .................................................. 353/94
See application file for complete search history.

(56) References Cited

U.S. PATENT DOCUMENTS

| | | | |
|---|---|---|---|
| 7,661,824 B2 * | 2/2010 | Beasley | .......................... 353/57 |
| 2002/0105623 A1 | 8/2002 | Pinhanez | |
| 2003/0191836 A1 | 10/2003 | Murtha et al. | |
| 2005/0052622 A1 | 3/2005 | Morishita | |
| 2005/0219271 A1* | 10/2005 | Tanaka | .......................... 345/690 |

(Continued)

FOREIGN PATENT DOCUMENTS

| | | |
|---|---|---|
| CA | 2191711 A1 | 12/1995 |
| EP | 1513007 A1 | 3/2005 |
| EP | 2034357 A1 | 3/2009 |
| JP | 2005-274816 A | 10/2005 |
| JP | 2007-147786 A | 6/2007 |
| KR | 10-1031062 B1 | 4/2011 |

OTHER PUBLICATIONS

European Search Report for European Application No. 14186555.
SIPO Office Action for Chinese Patent Application No. 201380001392.7.
International Search Report for International Application No. PCT/KR2013/006145.
European Search Report for European Application No. 13175920.1.

*Primary Examiner* — William C Dowling
*Assistant Examiner* — Ryan Howard
(74) *Attorney, Agent, or Firm* — LRK Patent Law Firm

(57) ABSTRACT

The present invention provides a projection device management system including two or more projection devices which project images on a projection surface; and a management device which corrects the image projected by each projection device based on information on each projection device and manages information for maintenance of each projection device, the two or more projection devices being installed in the same theater.

17 Claims, 5 Drawing Sheets

(56) References Cited

U.S. PATENT DOCUMENTS

| | | |
|---|---|---|
| 2006/0290896 A1* | 12/2006 | Nishida .................. 353/69 |
| 2007/0216876 A1 | 9/2007 | Narikawa |
| 2008/0013057 A1 | 1/2008 | Bullock |
| 2009/0066858 A1 | 3/2009 | Turner et al. |
| 2009/0120631 A1 | 5/2009 | Chou et al. |
| 2009/0213337 A1 | 8/2009 | Kondo et al. |
| 2011/0210987 A1 | 9/2011 | Furui |
| 2014/0016100 A1* | 1/2014 | Kim et al. .................. 353/30 |

* cited by examiner

PROJECTION DEVICE MANAGEMENT SYSTEM

CROSS-REFERENCE TO RELATED PATENT APPLICATION

This application claims the benefits of Korean Patent Applications No. 102012-0076100 filed on Jul. 12, 2012, No. 10-2012-0130111 filed on Nov. 16, 2012, in the Korean Intellectual Property Office, the disclosure of which is incorporated herein in its entirety by reference.

BACKGROUND OF THE INVENTION

1. Field of the Invention

The present invention relates to a projection device management system and, more particularly, to a projection device management system which can correct images projected by two or more projection devices installed in a theater, control the operation of the two or more projection devices, and further manage maintenance information on the two or more projection devices.

2. Description of the Related Art

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing audiences with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and glasses equipped with polarizing filters are worn by the audience such that different images are presented to the left and right eyes during watching.

However, these 3D technologies can provide audiences with 3D images, but the audiences just watch the images reproduced on a single screen, which may reduce the involvement in the images. Moreover, the direction of the 3D effect that the audiences feel is limited to the direction of the single screen.

Furthermore, according to the conventional 3D technologies, the audiences must wear glasses equipped with polarizing filters during watching, which may make the audiences feel inconvenient, and different images are artificially presented to the left and right eyes, which may make some sensitive audiences feel dizzy or nausea.

Therefore, a so-called "multi-projection system" which can solve the problems of the conventional projection systems based on a single screen has been proposed. The "multi-projection system" refers to a technology in which a plurality of projection surfaces are arranged around an auditorium such that synchronized images are reproduced on the plurality of projection surfaces, thus providing audiences with the 3D effect and involvement.

Meanwhile, two or more projection devices for projection images on the plurality of projection surfaces are required to implement the "multi-projection system". However, the conventional projection systems are to simply use a single projection device, and thus when two or more projection devices are installed in the theater, they cannot integratedly manage and operate them.

Therefore, there is a need to develop a new system which can integratedly manage and maintain two or more projection devices installed in the theater.

SUMMARY OF THE INVENTION

The present invention has been made in an effort to solve the above-described problems associated with prior art, and an object of the present invention is to provide a projection device management system which can correct images projected by two or more projection devices installed in a theater and manage maintenance information on the two or more projection devices.

To achieve the above object, a projection device management system in accordance with an embodiment of the present invention may comprise: two or more projection devices which project images on a projection surface; and a management device which corrects the image projected by each projection device based on information on each projection device and manages information for maintenance of each projection device, the two or more projection devices being installed in the same theater.

Here, the two or more projection devices may project images on a plurality of projection surfaces arranged so as not to be parallel to each other.

The two or more projection devices may project images which are synchronized with each other.

The management device may correct the image projected by each projection device based on a difference in performance between the two or more projection devices.

The management device may correct the image to be projected by each projection device based on a difference in brightness, difference in contrast, difference in resolution, or difference in physical position between the two or more projection devices.

The management device may correct the image to be projected by each projection device based also on information on the plurality of projection surfaces.

The management device may correct the image to be projected by each projection device based on the properties of the plurality of projection surfaces and control the two or more projection devices to project images of the same brightness.

Each projection device may include a lamp and the management device may control the operation of the lamps included in the two or more projection devices and equally maintains the brightness of the lamps.

The information for maintenance may include operation time information of a lamp or cooling fan installed in each projection device.

A current detection device may be provided in the lamp or cooling fan and the management device may obtain the operation time information of the lamp or cooling fan based on information collected by the current detection device.

The management device may generate replacement guide information if the operation time of the fan or cooling fan is greater than a reference value and the replacement guide information may include identification information of the projection device which needs to replace the lamp.

The information for maintenance may include brightness information of the lamp installed in each projection device.

The management device may generate replacement guide information if the brightness of the lamp is less than a reference value or if the brightness of the lamp is not maintained constant over time and the replacement guide information may include identification information of the projection device which needs to replace the lamp.

The management device may generate replacement guide information if the difference in brightness between the lamps included in the two or more projection devices is greater than a reference value and the replacement guide information may include identification information of the projection device which needs to replace the lamp.

The information for maintenance may include position information of each projection device.

A position detection device may be provided in each projection device and the management device may obtain the position information of each projection device based on information collected by the position detection device.

The management device may generate, if the position of a specific projection device is changed, information for informing the corresponding event, and the information may include identification information of the projection device whose position is changed.

Each projection device may detect internal temperature or humidity and, if the temperature or humidity of a specific projection device is greater than a reference value, the management device may stop the operation of the corresponding projection device.

The management device may comprise: an image correction unit which corrects the image projected by each projection device based on the information on each projection device; and a maintenance management unit which generally manages the information for maintenance of each projection device.

The projection device may comprise: a current detection unit which detects the current flowing in a lamp or cooling fan; a brightness detection unit which detects the brightness of the lamp; a position detection unit which detects the position of the projection device; a temperature detection unit which detects the temperature of the inside of the projection device; and a humidity detection unit which detects the humidity of the inside of the projection device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a projection device management system in accordance with embodiments of the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Meanwhile, the term "comprising" specific components is an "open-ended term" that simply means that the corresponding components are present and should not be understood to exclude other additional components.

A projection device management system in accordance with an embodiment of the present invention will be described with reference to FIGS. 1 to 5 below.

Figure 1:
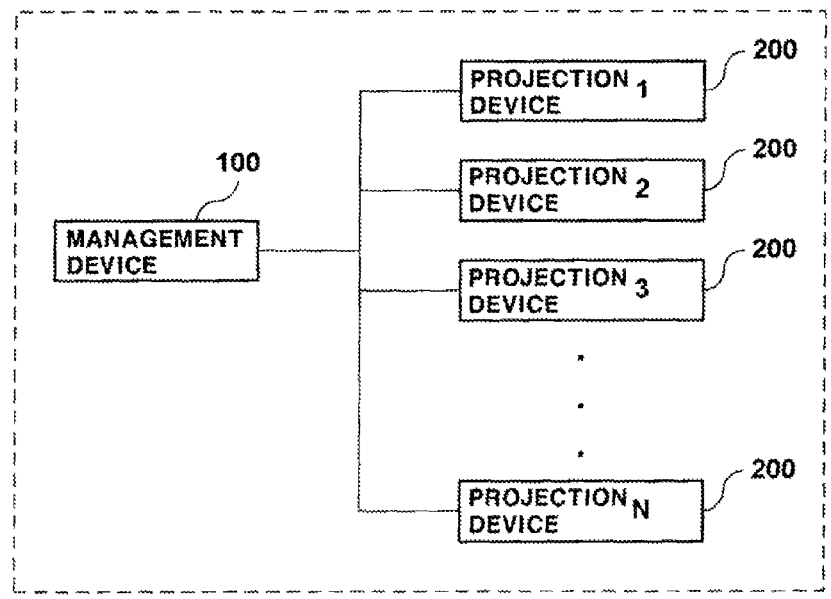
FIGS. 1 and 2 are diagrams showing the configuration of a projection device management system in accordance with an embodiment of the present invention.
Figure 2:
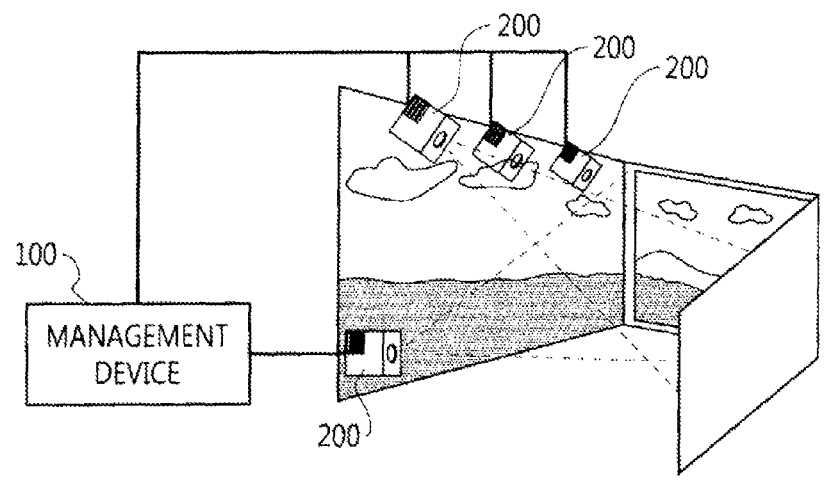

Referring to FIGS. 1 and 2, a projection device management system in accordance with an embodiment of the present invention may comprise two or more projection devices 200 which project images on a projection surface and a management device 100 which corrects the image projected by each projection device based on information on each projection device and manages maintenance information on each projection device. The two or more projection devices may preferably be installed in the same theater.

Meanwhile, the above-mentioned "information on each projection device" refers to information related to each projection device and may comprise a variety of information related to the projection device such as performance information (e.g., the brightness, contrast, resolution, etc.) of each projection device, property information (e.g., the brightness, material, color, reflectivity, shape, installed structure, etc.) of the projection surface on which each projection device projects an image, etc.

The two or more projection devices 200 refer to devices that project images on the projection surface. These projection devices 200 may have a heating unit such as an optical system, may project enlarged images on the projection surface, and may be implemented in various ways. For example, the projection devices 200 may be implemented by using a cathode ray tube (CRT), using a liquid crystal display (LCD), by digital light processing (DLP) using a digital micromirror device (DMD), etc.

Furthermore, the two or more projection devices 200 may be electrically connected to the management device 100 and integratedly controlled by the management device 100. In this case, the two or more projection devices 200 may be connected in parallel to the management device 100 such that both an integrated control and an individual control are possible. Accordingly, the two or more projection devices 200 may be integratedly or individually controlled by the management device 100 to project images under these controls. Meanwhile, the projection devices 200 and the management device 100 may be connected to each other in various ays as well as through a wired or wireless communication network.

In addition, the two or more projection devices 200 may be implemented as devices with different performances. For example, the two or more projection devices 200 may be implemented as devices with differences in performance such as a difference in contrast between each other, difference in resolution, difference in performance due to a difference in physical position, difference in brightness (ANSI Lumens), etc. The differences in performance may occur depending on the types (models) of the projection devices 200 installed in the theater, may occur due to a difference in use time or internal parts, or may occur due to a difference in installation environment. Meanwhile, the differences in performance between the two or more projection devices 200 may be integratedly controlled by the management device 100. For example, the management device 100 may database information on the differences in performance between the projection devices 200 and store and manage the information in a database.

Additionally, the two or more projection devices 200 may receive images to project from the management device 100. Here, it is preferable that the image received by each projection device 200 is an image corrected by the management device 100, and the image correction by the management device 100 may preferably be performed for each image of each projection device 200 based on individual information of each projection device 200. Moreover, the image correction by the management device 100 may be performed based on the information on the differences in performance between the two or more projection devices 200 so as to reduce the heterogeneity of the images which may occur due to the differences in performance.

Moreover, each projection device 200 may detect an individual operation (on) of a lamp or cooling fan installed therein and transmit the detected information to the management device 100. In detail, the projection device 200 may determine whether the lamp or cooling fan operates (on) by detecting the current flowing in the lamp or cooling fan and transmit the detected information together with its identification information to the management device 100. As a result, the management device 100 can manage cumulative operation time information of the lamp or cooling fan installed in each projection device 200. Meanwhile, the projection device 200 may monitor operation time information of the lamp or cooling fan installed therein and, if the operation time information is greater than a predetermined reference time, determine that replacement time comes and autonomously issue a warning.

Furthermore, the projection device 200 may detect the brightness of the lamp installed therein and transmit the detected information together with its identification information to the management device 100. In detail, the projection device 200 may include a sensor device for detecting the brightness of the lamp to collect brightness information of the lamp by means of the sensor device and transmit the collected information to the management device 100. Meanwhile, it is preferable that the sensor device collects the brightness information over time and transmits the collected information to the management device 100. Moreover, the projection device 200 may monitor the detected information (brightness information) of the sensor device included therein and, if the brightness information is less than a reference value or is unstably changed, determine that the lamp has a failure and autonomously issue a warning.

In addition, the projection device 200 may collect temperature or humidity information of the inside of the device and transmit the collected information together with its identification information to the management device 100. In this case, the projection device 200 may comprise a temperature sensor or humidity sensor therein to collect the temperature or humidity information by means of the temperature sensor or humidity sensor and transmit the collected information to the management device 100. Meanwhile, the projection device 200 may autonomously monitor the temperature or humidity therein and, if the temperature or humidity is outside a predetermined range, determine that there is a failure and autonomously issue a warning.

Additionally, the projection device 200 may detect its position and transmit the detected position information to the management device 100. In detail, the projection device 200 may include a position detection sensor (e.g., a 3-axis acceleration sensor, 3-axis gyro sensor, etc.) which detects its position and transmit the detected position information together with its identification information to the management device 100. As a result, the management device 100 can manage the position information of the respective projection devices 200 and identify an unexpected change in position of a specific projection device. Meanwhile, the projection device 200 may monitor information detected by the position sensor installed therein and, if the position is unexpectedly changed, autonomously issue a warning.

The management device 100, which is a device that generally manages the two or more projection devices 200, generally controls the two or more projection devices 200 and manages a variety of information related to the two or more projection devices 200. The management device 100 may be implemented with various electronic devices and may be implemented in a single electronic device or in such a manner that several electronic devices are interconnected. For example, the management device 100 may be implemented in a single server or in such a manner that two or more servers are interconnected. Moreover, the management device 100 may be implemented in such a manner that a server and other electronic devices are interconnected or implemented in arithmetic units other than the server. Furthermore, the management device 100 may be connected in parallel to the two or more projection devices 200, thus controlling the respective projection devices 200 individually or integratedly.

Meanwhile, the management device 100 may correct the images projected by the two or more projection devices 200 and transmit the corrected images to the respective projection devices 200. In detail, the management device 100 may individually correct the images of the respective projection devices 200 based on individual information of each projection device 200 and transmit the corrected images to the respective projection devices 200. Here, the individual information which is taken into account by the management device 100 during image correction may include a variety of information such as property information (e.g., the material, color, reflectivity, shape, installed structure, etc.) of the projection surface on which each projection device 200 projects an image, performance information (e.g., the brightness, contrast, resolution, quality depending on the physical position, etc.) of each projection device 200, etc., and these information may preferably be databased and stored in the management device 100.

Moreover, the management device 100 may correct the images based on information on differences in performance between the projection devices 200. In detail, the management device 100 may correct the images of the respective projection devices 200 so as to reduce the heterogeneity of the images, which may occur due to the differences in performance, based on the information on the differences in performance between the two or more projection devices 200 (such as information on difference in contrast, difference in brightness, difference in resolution, difference in quality depending on the physical position).

The image correction based on these differences in performance will now be described in more detail. First, the management device 100 may reduce the heterogeneity of the images, which may occur due to a difference in brightness between the respective projection devices 200, by the image correction. For example, if the brightness of projection device A is 500 ANSI Lumens, the brightness of projection device B is 1000 ANSI Lumens, and the brightness of projection device C is 1500 ANSI Lumens, the difference in brightness may be offset by the image correction. In detail, the brightness ratio of the images projected by projection devices A, B, and C is corrected to 3:2:1, thus offsetting the heterogeneity of the images which may occur due to the difference in brightness between the devices. Meanwhile, the image correction by the difference in brightness may be automatically performed at every moment when the brightness of each projection device 20 varies, based on the brightness information of the respective projection devices which are collected in real time. In detail, each projection device 200 may detect the brightness of the lamp installed therein and transmit the corresponding information to the management device 100, and thus the management device 100 can detect the change in brightness of each projection device 200 based on the received information. As a result, the management device 100 can newly calculate the difference in brightness upon detection of the difference in brightness and newly correct the images.

Moreover, the management device 100 may reduce the heterogeneity of the images, which may occur due to a difference in contrast between the respective projection devices 200 by the image correction. For example, if the contrast of projection device A is lower than that of projection B, the difference in contrast may be offset by increasing the difference in contrast between pixels of an image projected by projection A or reducing the difference in contrast between pixels of an image projected by projection B.

Furthermore, the management device 100 may reduce the heterogeneity of the images, which may occur due to a difference in resolution supported by the respective projection devices 200 or a difference in physical position (e.g., a distance between the projection surface and the projection device 200), by the image correction. In detail, the physical positions (e.g., distances to the projection surface) of the two or more projection devices 200 and the resolutions supported by the two or more projection devices 200 are different from each other, and in this case, if the images of the projection devices 200 are corrected in the same manner, the qualities of the images reproduced by the respective projection devices 200 may be different from each other. This is because the sizes of unit pixels of the images projected on the projection surface may be different from each other due to the difference in physical position and a specific projection device 200 may not support a specific resolution. Therefore, it is preferable that the management device 100 individually corrects the images of the respective projection devices 200 based on these differences so as to reduce the difference in quality of the images by the image correction. For example, the management device 100 may calculate information on the sizes of unit pixels of the images, reproduced by the respective projection devices 200, based on the resolution supported by each projection device 200 and the physical position of each projection device 200, and correct the images of the respective projection devices 200 such that the sizes of unit pixels are equal to each other in all projection devices 200.

Meanwhile, the management device 100 may manage information related to maintenance of the two or more projection devices 200 and transmit the information to the outside or autonomously display the information thereon. In detail, the management device 100 may manage cumulative operation time information of a lamp or cooling fan installed in each projection device 200 and inform the replacement time of the lamp or cooling fan based on this information. Moreover, the management device 100 may manage brightness information of the lamp installed in each projection device 200 and inform a lamp, which needs to be replaced, based on this information. Furthermore, the management device 100 may manage information on difference in brightness between lamps installed in the two or more projection devices 200 and inform the need to replace a lamp base d on this information. In addition, the management device 100 may manage position information of each projection device 200 and, if the position of a specific projection device is changed, inform the corresponding event based on this information. Additionally, the management device 100 may manage temperature or humidity information of each projection device 200 and inform the need to prevent or check a failure of each projection device 200 based on this information.

Next, the operation related to maintenance of the management device 100 will be described in more detail.

First, the management device 100 may manage cumulative operation time of a lamp or cooling fan installed in each projection device 200 and inform the replacement time of the lamp or cooling fan based on the managed information. In detail, a current detection device (sensor) may be installed in the lamp or cooling fan of each projection device 200 to collect operation information by detecting the current of the lamp or cooling fan, and the collected operation information may be transmitted to the management device 100 and managed. As a result, the management device 100 can calculate secondary information by analyzing the received information and, in particular, calculate and manage cumulative use time information of the lamp or cooling fan of each projection device 200. Here, if the cumulative operation time of the lamp or cooling fan of each projection device 200 is greater than a predetermined reference value (e.g., 2000 hours), the management device 100 may recognize the corresponding event and inform the need to replace the corresponding lamp or cooling fan in the event of such an event. For example, the management device 100 may notify the corresponding event to a manager computer connected thereto or provide replacement information through a display unit provided therein. Here, it is preferable that the replacement information provided by the management device 100 includes identification information of the projection device 100 which needs to replace the lamp or cooling fan.

Next, the management device 100 may manage brightness information of the lamp installed in each projection device 200 and inform a lamp, which needs to be replaced, based on this information. In detail, a brightness detection device (sensor) may be installed in each projection device 200 to collect brightness information of the lamp, and the collected information may be transmitted to the management device 100 and managed. As a result, the management device 100 can collect the brightness information of the lamp installed in each projection device 200 and, in particular, collect information on change in brightness over time. Here, if the brightness of the lamp installed in each projection device 200 is less than a reference value or is unstably changed over time, the management device 100 may recognize the corresponding event and inform the need to replace the lamp in the event of such an event. For example, the management device 100 may notify the corresponding event to a manager computer connected thereto or provide replacement information through a display unit provided therein. Here, it is preferable that the replacement information provided by the management device 100 includes identification information of the projection device 100 which needs to replace the lamp.

Next, the management device 100 may manage information on difference in brightness between lamps installed in the two or more projection devices 200 and inform the need to replace a lamp based on this information. In detail, the management device 100 may calculate and manage the information on the difference in brightness between the lamps based on the collected brightness information of the lamps. In this case, the management device 100 corrects the images of the respective projection devices 200 so as to offset the difference in brightness based on the calculated information on the difference in brightness. However, if the difference in brightness between the lamps increases, the heterogeneity of the images cannot be offset even by the image correction. Accordingly, if the difference in brightness between the lamps is beyond the limit that can be offset by the correction, the management device 100 may identify the lamp of the projection device 200, which causes the corresponding difference in brightness, and inform the need to replace the identified lamp. For example, the management device 100 may notify the corresponding event to a manager computer connected thereto or provide replacement information through a display unit provided therein. Here, it is preferable that the replacement information provided by the management device 100 includes identification information of the projection device 100 which needs to replace the lamp.

Next, the management device 100 may manage position information of each projection device 200 and, if the position of a specific projection device is unexpectedly changed (e.g., due to an external environment factor such as vibration), inform the corresponding event based on the managed information. In detail, a position detection sensor (e.g., a 3-axis acceleration sensor, 3-axis gyro sensor, etc.) may be installed in each projection device 200 to collect the position information by detecting the position of the projection device, and the collected position information may be transmitted to the management device 100 and managed. Here, if the position of each projection device 200 is changed, the management device 100 may recognize the corresponding event and inform the change in the position of the projection device in the event of such an event. For example, the management device 100 may notify the corresponding event to a manager computer connected thereto or inform the change in the position through a display unit provided therein. Here, it is preferable that the information provided by the management device 100 includes identification information of the projection device 100 whose position is changed.

Next, the management device 100 may manage temperature or humidity information of each projection device 200 and inform the need to prevent or check a failure of each projection device 200 based on this information. In detail, a temperature detection device (sensor) or humidity detection device (sensor) may be installed in each projection device 200 to collect temperature or humidity information of the inside of the projection device 200, and the collected temperature or humidity information may be transmitted to the management device 100 and managed. Here, if the temperature of the inside of a specific projection device 200 is greater than a reference value (e.g., 80° C.) or if the humidity of the inside is greater than a reference value (e.g., 80%), the management device 100 may remotely stop the operation of the corresponding projection device 200. Moreover, the management device 100 may provide information for requesting to check the corresponding projection device 200 together with its identification information.

Meanwhile, the two or more projection devices 200 may project images on a plurality of projection surfaces which are arranged not to be parallel to each other. Moreover, the two or more projection devices 200 may project images, which are synchronized with each other, on the plurality of projection surfaces. Here, it is preferable that a unified image is reproduced on the entire projection surface, and separate images may be reproduced on the plurality of projection devices depending on the situations.

Here, the plurality of projection surfaces may be arranged so as not to be parallel to each other. According to the prior art, an image is projected only on a screen placed in front of a theater such that an audience watches the image reproduced on the two-dimensional screen or a 3D technology is applied to the image itself reproduced on a plane. On the contrary, according to the present invention, the plurality of projection surfaces are three-dimensionally arranged so as not to be parallel to each other, and thus it is possible to provide the audience with a three-dimensional image with high 3D effect and involvement through the three-dimensionally arranged plurality of projection surfaces without applying the 3D technology to the image itself.

Moreover, it is preferable that the plurality of projection surfaces are arranged to surround an auditorium in the theater. Therefore, the audiences can feel as if they are in a space created by the unified image reproduced on the plurality of projection surfaces, and thus the three-dimensional effect, involvement, and virtual reality that the audiences feel can be maximized.

Furthermore, the angle between the plurality of projection surfaces is not limited to a specific angle, and the plurality of projection surfaces may be arranged at various angles as long as the audiences can feel the three-dimensional effect.

In addition, the plurality of projection surfaces may be arranged to be adjacent to each other or to be spaced from each other and, even in this case, it is preferable that the plurality of projection surfaces are arranged to surround the auditorium.

Figure 3:
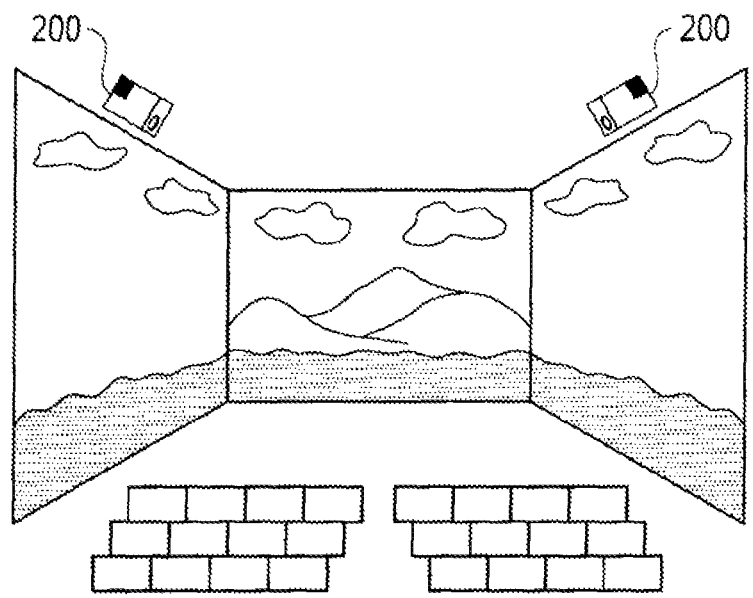
FIGS. 3 to 5 are diagrams showing examples of a plurality of projection surfaces.
Figure 4:
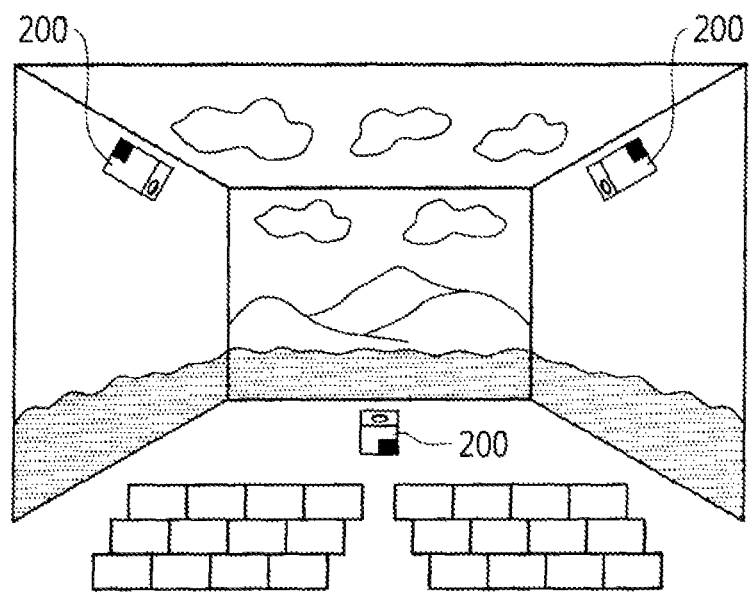
Figure 5:
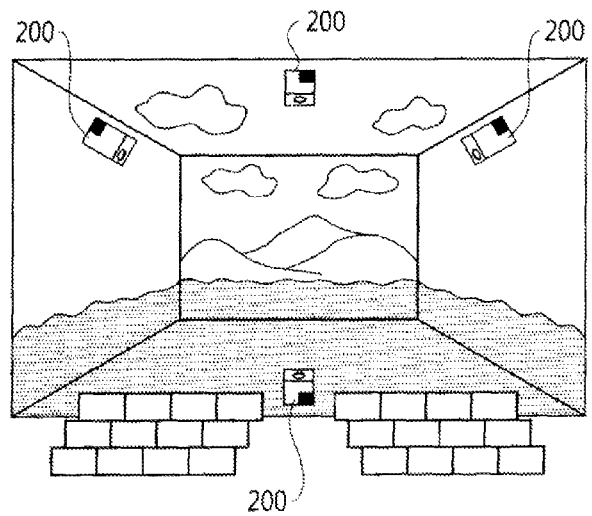

FIG. 3 is a diagram showing an example in which the plurality of projection surfaces are arranged on the front, left, and right sides with respect to the auditorium, FIG. 4 is a diagram showing an example in which the plurality of projection surfaces are arranged on the front, left, right, and top sides with respect to the auditorium, and FIG. 5 is a diagram showing an example in which the plurality of projection surfaces are arranged on the front, left, right, top, and bottom sides with respect to the auditorium.

Meanwhile, the plurality of projection surfaces may comprise different types of projection surfaces. For example, the plurality of projection surfaces may be configured in such a manner that a screen and a wall are mixed, different types of screens are mixed, or different types of walls are mixed. Thus, the present invention is also applicable to a conventional theater comprising a single screen and a plurality of walls and can implement a multi-projection service even though a plurality of screens are not provided. However, in these environments, the unity of the images reproduced on the plurality of projection surfaces may be reduced due to heterogeneity (color, reflectivity, etc.) between the screen and the walls, but this problem can be overcome by image correction of the management device 100. In detail, the management device 100 may individually correct the images projected on the respective projection surfaces based on the relative properties (color, reflectivity, etc.) of the screen and the walls, thus creating a unified image on the entire projection surface.

Moreover, the number of projection devices 200 which project images on the respective projection surfaces may differ depending on the size of each projection surface. For example, two or more projection devices 200 may project images together on a projection surface of a relatively large size, and a single projection device 200 may project an image on a projection surface of a relatively small size. Meanwhile, in the case where two or more projection devices project images on a single projection surface, the overlapping parts of the images projected by the respective projection device 200 may not be smooth, which can be solved by edge blending correction of the management device 100.

Meanwhile, the management device 100 may preferably perform image correction (first correction) based on the differences in performance of the projection devices 200 and image correction (second correction) based on the properties of the plurality of projection surfaces at the same time.

Through the two-phase image correction (first and second corrections), the unity of the images projected on the plurality of projection surfaces can be further increased.

The first correction is based on the differences in performance of the projection devices 200, which has been described in detail above.

The second correction is based on the properties of the plurality of projection surfaces and may be performed by the management device 100. Here, the properties of the projection surfaces may include various properties related to the projection surfaces, such as the material, color, reflectivity, shape of the projection surface, installed structure, etc.

The second correction will now be described in more detail. The management device 100 may correct the images projected by the two or more projection devices 200 based on the properties of the plurality of projection surfaces. In detail, the management device 100 may correct the images by individually or relatively analyzing the shape, material, color, reflectivity, brightness, etc. of the plurality of projection surfaces such that the two or more projection devices 200 can create a unified image. For example, the management device 100 may correct the images by analyzing the differences in color, reflectivity, brightness, etc. of the respective projection surfaces so as to offset the analyzed differences. Moreover, the management device 100 may perform image warping correction, masking correction, etc. based on the shapes of the respective projection surfaces so as to prevent image distortion on each projection surface. Furthermore, the management device 100 may increase the unity of images by edge blending correction based on the shapes of the respective surfaces.

Various embodiments for ensuring the unity of the images projected by the two or more projection devices 200 have been described. In detail, the image correction (1) based the differences in performance of the respective projection devices 200 and the image correction (2) based on both the differences in performance of the respective projection devices 200 and the properties of the projection surfaces have been described.

Meanwhile, the management device 100 may ensure the unity of images by another embodiment, which will be described in brief below.

According to another embodiment of the present invention, the management device 100 may ensure the unity of images in a manner to equally maintain output values of lamps included in the respective projection devices 200 after the above-described image correction based on the properties of the projection surfaces (if the output values of the lamps are different from each other, the heterogeneity of images may occur). That is, the management device 100 can ensure the unity of images in a manner to perform the correction based on the properties of the plurality of projection surfaces and then control the output values of the lamps of the respective projection devices 200.

Here, the output value (brightness) of the lamp included in each projection device 200 may preferably be changed by electronic control or controlled by the management device 100. Moreover, the management device 100 may detect in real time the output value of the lamp by means of a sensor device included in each projection device 200. Thus, the management device 100 can integratedly manage the output values of the lamps included in the two or more projection devices 200 and, when the output value of a lamp included in a specific projection device is changed, can change the output value to be the same as others by means of a control signal.

Meanwhile, the correction based on the properties of the plurality of projection surfaces is the same as the above-described second correction, and thus detailed description thereof will be omitted.

That is, each projection device 200 receives an image, which is corrected based on the properties of the projection surface (e.g., the shape, material, color, reflectivity, brightness, etc.), from the management device 100 and projects the corrected image on the corresponding projection surface. Here, if the performances of the respective projection devices 200 (e.g., the output values of the lamps) are different from each other, the sense of color or unity between the images may be somewhat reduced. Therefore, when the management device 100 equally controls the states of all projection devices 200 in the theater (e.g., the output values (definition, etc) of the lamp), the above problem can be solved, thus outputting unified images with unified color.

Meanwhile, it is apparent that the management device 100 can change the projection angle, installation position, etc, of each projection device 200 based on an external input signal so as to precisely match the positions of the images projected on the plurality of projection surfaces. Here, the projection angle of each projection device 200 may preferably be changed by electronic control or controlled by the management device 100. Likewise, the installation position of each projection device 200 may preferably be changed by electronic control (e.g., rails are provided on the installation surface of the projection device to move to a corresponding coordinate value) or controlled by the management device 100.

Figure 6:
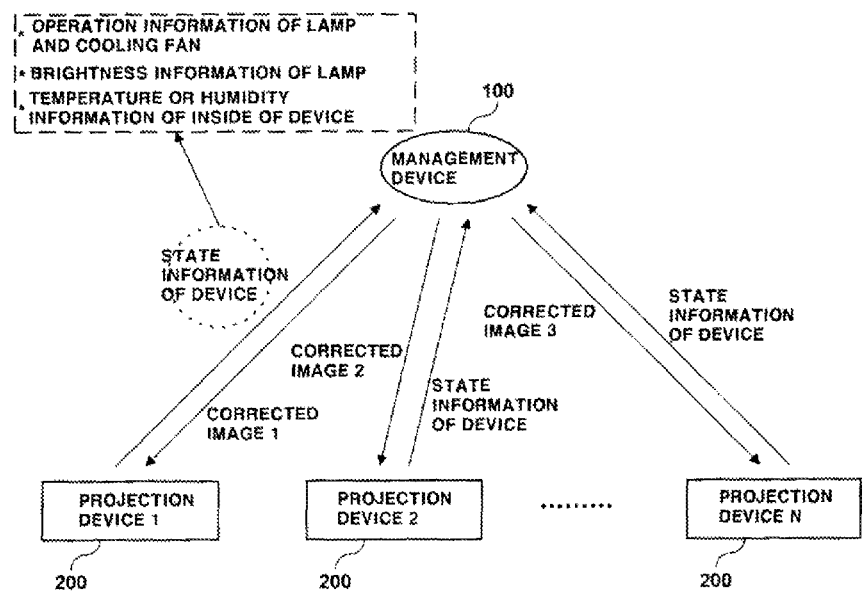
FIG. 6 is a diagram showing the operation of a projection device management system in accordance with an embodiment of the present invention.

Next, the maintenance operation performed by a projection device management system in accordance with an embodiment of the present invention will be described with reference to FIGS. 6 to 8.

Figure 7:
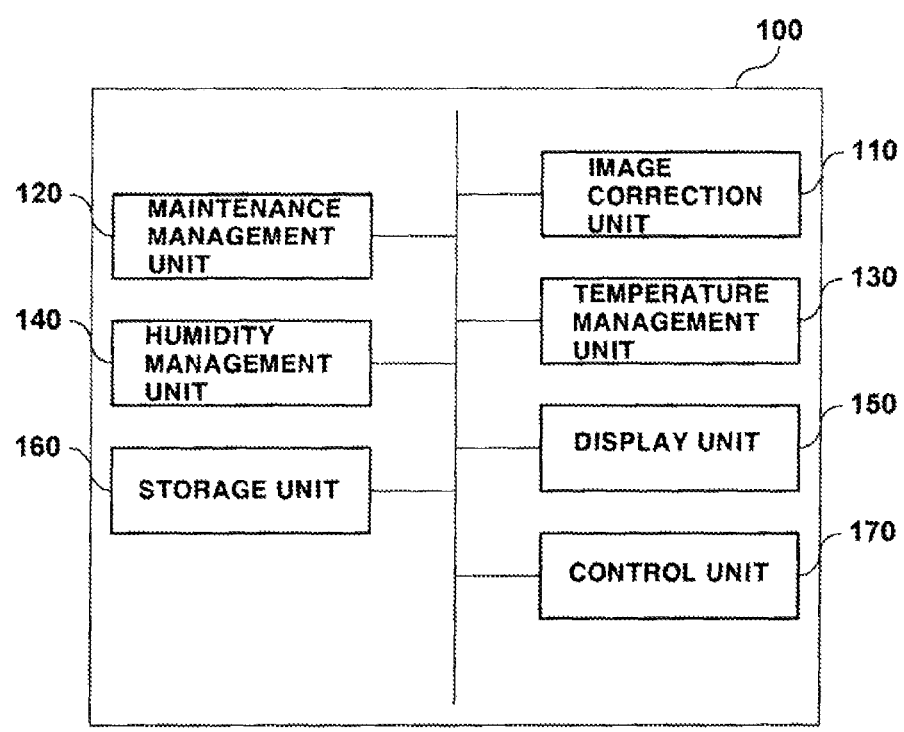
FIG. 7 is a diagram showing the configuration of a management device included in a projection device management system in accordance with an embodiment of the present invention.

Referring to FIG. 7, the management device 100 may comprise an image correction unit 110, a maintenance management unit 120, a temperature management unit 130, a humidity management unit 140, a display unit 150, a storage unit 160, and a control unit 170.

The image correction unit 110 corrects the images projected by the two or more projection devices 200. It is preferable that the image correction unit 110 individually performs the image correction for each projection device 200 and, in particular, differentially corrects the images of the respective projection devices 200 based on the difference in brightness between the respective projection devices 200.

The maintenance management unit 120 generally manages information related to the maintenance of the two or more projection devices 200 and processes or provides a variety of information related to the maintenance. For example, the maintenance management unit 120 may inform the replacement time of a lamp or cooling fan installed in each projection device 200 by calculating cumulative operation time information of the lamp or cooling fan or determine the need to replace the lamp by analyzing brightness information of the lamp installed in each projection device 200. Moreover, the maintenance management unit 120 may determine the need to replace the lamp by recognizing information on the difference in brightness between the projection devices 200. Furthermore, the maintenance management unit 120 may manage position information of each projection device 200 and identify an unexpected change in position of a specific projection device.

The temperature management unit 130 and the humidity management unit 140 manage the temperature and humidity of the inside of the projection device 200. The temperature management unit 130 and the humidity management unit 140 may inform the need to prevent or check a failure of each projection device 200 by analyzing temperature and humidity information of the projection device 200. For example, if the internal temperature or humidity of a specific projection device 200 is greater than a reference value, the temperature management unit 130 or the humidity management unit 140 may remotely stop the operation of the corresponding projection device 200 and inform the need to check the corresponding projection device 200.

The display unit 150, which may be further optionally included in the management device 100, displays a variety of information managed by the management device 100. The above-described information related to the maintenance may be displayed on the display unit 150 and, in this case, it is preferable that information related to the maintenance includes identification information of a projection device 200 having a failure. Meanwhile, the display unit 150 may be integrally included in the management device 100, may be configured as a separate external connection device, or may be implemented with various display devices.

The storage unit 160 stores a variety of information related to the operation of the management device 100. The storage unit 160 may temporarily or permanently store the above-described information related to the maintenance.

The control unit 170 controls various operations of the management device 100 including the operations of the image correction unit 110, the maintenance management unit 120, the temperature management unit 130, the humidity management unit 140, and the display unit 150. The control unit 170 may be implemented in various arithmetic units.

Figure 8:
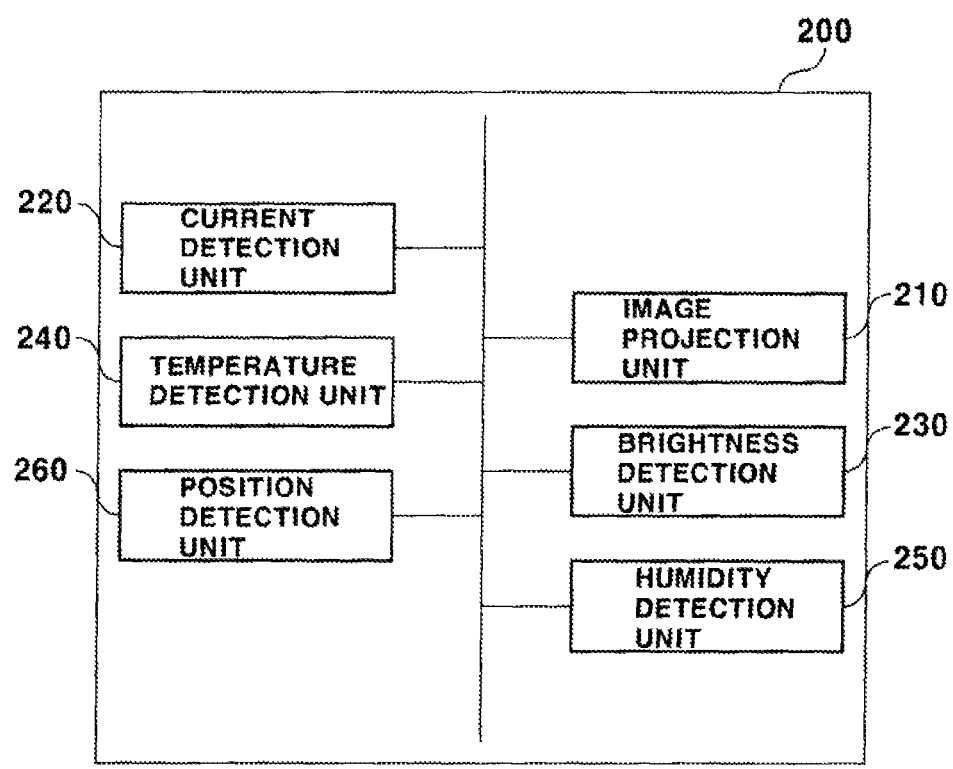
FIG. 8 is a diagram showing the configuration of a projection device included in a projection device management system in accordance with an embodiment of the present invention.

Referring to FIG. 8, each projection device 200 may comprise an image projection unit 210, a current detection unit 220, a brightness detection unit 230, a temperature detection unit 240, a humidity detection unit 250, and a position detection unit 260.

The image projection unit 210 projects a corrected image transmitted from the management device 100 on a projection surface. The image projection unit 210 may receive the corrected image from the management device 100 and project the received image on the projection surface and, in this case, the corresponding image has been corrected based on the properties of the projection surface (e.g., the brightness, material, color, reflectivity, shape, installed structure, etc.) and the performance of the projection device (e.g., the brightness, contrast, resolution, etc.). Meanwhile, a lamp may be included in the image projection unit 210, and the brightness of the projected image can be adjusted by the lamp.

The current detection unit 220 detects the operation (on) of a cooling fan or lamp installed in the projection device 200. In detail, the current detection unit 220 may determine whether the cooling fan or lamp operates (on) by detecting the current flowing in the cooling fan or lamp and transmit the detected information to the management device 100.

The brightness detection unit 230 detects the brightness of the lamp that may be included in the image projection unit 210 and transmits the detection brightness information to the management device 100. The brightness detection unit 230 may be implemented with various sensor devices.

The temperature detection unit 240 and the humidity detection unit 250 detect the temperature and humidity of the inside of the projection device 200 and transmit the detected temperature and humidity information to the management device 100. The temperature detection unit 240 and the humidity detection unit 250 may be implemented with various sensor devices.

The position detection unit 260 detects the position of the projection device 200 and transmits the detected position information to the management device 100. The position detection unit 260 may be implemented with various sensor devices for detecting the position, such as a 3-axis acceleration sensor, 3-axis gyro sensor, etc.

The maintenance operation performed by the projection device management system will now be described with reference to FIGS. 6 to 8. The maintenance operation of the projection device management system may be generally divided into five operations. In detail, the maintenance operation of the projection device management system may be divided into (1) maintenance operation based on the operation time of a lamp or cooling fan installed in each projection device 200, (2) maintenance operation based on brightness information of the lamp installed in each projection device 200, (3) maintenance operation based on information on difference in brightness between the lamps installed in two or more projection devices 200, (4) maintenance operation based on position information of each projection device 200, and (5) maintenance operation based on temperature or humidity information of each projection device 200.

Firstly, the maintenance operation based on the operation time of the lamp or cooling fan installed in each projection device 200 will now be described. The current detection unit 220 of each projection device 200 collects operation information (on) of the lamp or cooling fan of each projection device 200 by detecting the current flowing in the lamp or cooling fan of the projection device 200. The operation information collected by the current detection unit 220 of each projection device 200 is transmitted to the maintenance management unit 120 of the management device 100, and thus the maintenance management unit 120 calculates cumulative operation time information of the lamp or cooling fan based on the collected information and manage each projection device 200 based on the collected information. Meanwhile, if the cumulative operation time of a specific lamp or cooling fan is greater than a predetermined reference value (e.g., 2000 hours), the maintenance management unit 120 may recognize the corresponding event and inform the need to replace the lamp or cooling fan in connection with the display unit 150 in the event of such an event. Here, it is preferable that the information for informing the need to replace the lamp or cooling fan includes identification information of the projection device 200 which needs to replace the lamp or cooling fan. Moreover, the maintenance management unit 120 may calculate in real time the cumulative operation time of the lamp or cooling fan of each projection device 200 and provide the calculated cumulative operation time through the display unit 150 in real time or at regular intervals (e.g., at a cumulative operation time of 500 hours, 1000 hours, 1500 hours, or 2000 hours).

Meanwhile, while the foregoing has described that the projection device 200 is informed about the replacement time of the corresponding lamp or cooling fan by the management device 100, the projection device 200 may determine the replacement time of the corresponding lamp or cooling fan based on the operation information collected by the current detection unit 220 and autonomously issue a warning (e.g., using a display unit, speaker, etc. included in the projection device).

Secondly, the maintenance operation based on the brightness information of the lamp installed in each projection device 200 will now be described. The brightness detection unit 230 of each projection device 200 collects the brightness information of the lamp installed in each projection device 200 and, in particular, collects information on change in brightness over time. The information collected by the brightness detection unit 230 of each projection device 200 is transmitted to the maintenance management unit 120 of the management device 100, and thus the maintenance management unit 120 diagnoses the performance of the lamp installed in each projection device 200 based on the collected information. In detail, if the brightness of a specific lamp installed in each projection device 200 is less than a reference value or is unstably changed over time, the maintenance management unit 120 may recognize the corresponding event and inform the need to replace the lamp through the display unit 150 in the event of such an event. Here, it is preferable that the information for informing the need to replace the lamp includes identification information of the projection device 200 which needs to replace the lamp. Moreover, the maintenance management unit 120 may provide the brightness information of the lamp installed in each projection device 200 through the display unit 150 in real time.

Meanwhile, if it is determined based on the brightness information collected by the brightness detection unit 230 that the brightness is less than a reference value or is unstably changed, the projection device 200 may determine that there is a failure and issue a warning (e.g., using a display unit, speaker, etc. included in the projection device) autonomously.

Thirdly, the maintenance operation based on the information on the difference in brightness between the lamps installed in the projection devices 200 will now be described. The maintenance management unit 120 may calculate and manage the information on the difference in brightness between the lamps, installed in the two or more projection devices 200, based on the collected brightness information of the lamps. Here, the image correction unit 110 may correct the images of the respective projection devices 200 so as to offset the difference in brightness between these lamps based on the calculated information on the difference in brightness. However, if the difference in brightness between the lamps increases, the heterogeneity of the images cannot be offset even by the image correction. Accordingly, the maintenance management unit 120 may recognize the case where the difference in brightness between the lamps is beyond the limit that can be offset by the correction (where the difference in brightness is greater than a reference value), identify the lamp of the projection device 200, which causes the corresponding difference in brightness, and inform the need to replace the identified lamp. Here, it is preferable that the information for informing the need to replace the lamp includes identification information of the projection device 200 which needs to replace the lamp. Moreover, the maintenance management unit 120 may provide the information on the difference in brightness between projection devices 200 through the display unit 150 in real time.

Fourthly, the maintenance operation based on the position information of each projection device 200 will now be described. The position detection unit 260 of each projection device 200 collects the position information of each projection device 200, and the collected information is transmitted to the maintenance management unit 120 of the management device 100. Here, the maintenance management unit 120 determines whether the position of each projection device 200 is changed based on the collected information and, in particular, determines whether the three-dimensional position of each projection device is changed. As a result of the determination, if the position of a specific projection device is changed, the maintenance management unit 120 may inform the corresponding event through the display unit 150. Here, it is preferable that the information for informing the change in the position of the specific projection device 200 includes identification information of the specific projection device 200 whose position is changed.

Meanwhile, the maintenance management unit 120 may directly correct the position of the specific projection device, whose position is changed, by electronic control. In this case, the position of each projection device 200 may preferably be changed by electronic control (e.g., rails are provided on the installation surface of the projection device to move to a corresponding coordinate value).

Moreover, if it is determined based on the position information collected by the position detection unit 260 that the position is changed, the projection device 200 may inform the change in the position and autonomously issue a warning (e.g., using a display unit, speaker, etc. included in the projection device).

Fifthly, the maintenance operation based on the temperature or humidity information of each projection device 200 will now be described. The temperature detection unit 240 or the humidity detection unit 250 of each projection device 200 detects the temperature or humidity of the inside of each projection device 200 and collects relevant information. The information collected by the temperature detection unit 240 or the humidity detection unit 250 of each projection device 200 is transmitted to the temperature management unit 130 or the humidity management unit 140 of the management device 100, and thus the temperature management unit 130 or the humidity management unit 140 may inform the need to prevent or check a failure of each projection device 200 by analyzing the received temperature or humidity information. In detail, if the temperature of the inside of a specific projection device 200 is greater than a reference value (e.g., 80° C.) or if the humidity of the inside is greater than a reference value (e.g., 80%), the temperature management unit 130 or the humidity management unit 140 may remotely stop the operation of the corresponding projection device 200. Moreover, the temperature management unit 130 or the humidity management unit 140 may provide information for requesting to check the corresponding projection device 200 together with its identification information through the display unit 150.

Meanwhile, if it is determined based on the temperature or humidity information collected by the temperature detection unit 240 or the humidity detection unit 250 that the temperature or humidity is greater than a reference value, the projection device 200 may determine that there is a failure and autonomously issue a warning (e.g., using a display unit, speaker, etc. included in the projection device).

As described above, according to the present invention, even when two or more projection devices are installed in a theater, it possible to integratedly manage and control the projection devices.

Moreover, the present invention can individually correct images projected by the respective projection devices based on differences in performance between the respective projection devices. In detail, the present invention can recognize information on the differences in performance between the respective projection devices (e.g., a difference in contrast, difference in resolution, difference in brightness or quality due to a difference in physical position, etc.) and correct the images projected by the respective projection devices so as to reduce these differences.

Furthermore, the present invention can manage operation time information based on the current input to a lamp or cooling fan and inform the replacement time of the lamp or cooling fan based on the managed operation time information. Thus, since the replacement time of the lamp is determined based on the operation state of the lamp, it is possible to inform the replacement time more accurately than a conventional method of informing the replacement time based only on the use time. According to the conventional method based on the use time, the replacement time is calculated without considering the operation time of the lamp while the shutter is closed, and thus it is impossible to provide accurate information.

In addition, the present invention can recognize the brightness of the lamp by means of a sensor and inform the need to replace the lamp even when there is a problem in the brightness of the lamp. In detail, if the brightness of the lamp is low or the change in brightness over time is large even if the lamp is not used for a long time, it is possible to detect the fact and inform the need to replace the lamp. Thus, it is possible to detect the occurrence of a problem in the lamp, which cannot be detected by checking the operation time only, thus making it possible for the projection device to project a high-quality image.

Additionally, the present invention can compare the brightness of the lamps installed in the two or more projection devices and, if the difference in brightness between the lamps is greater than a predetermined value, inform the need to replace the lamp. In detail, if the difference in brightness between the lamps is beyond the limit that can be offset by the correction, it is possible to direct the replacement of the corresponding lamps, thus preventing the respective projection devices from projecting heterogeneous images.

Moreover, the present invention can detect the temperature and humidity of each projection device and, if the temperature or humidity of a specific projection device is greater than a predetermined value, remotely stop the operation of the corresponding projection device. Thus, it is possible to prevent the projection devices from operating in high-temperature and high-humidity environment, which may cause a failure of the device, thus preventing the failure of the device and increasing the durability.

Furthermore, the present invention can provide an audience with an image with high 3D effect and involvement by projecting images on a plurality of projection surfaces.

In addition, the present invention can provide the audience with a multi-viewpoint image by projecting synchronized images on the plurality of projection surfaces that surround an auditorium, thus allowing the audience to experience a sense of reality as if he or she actually exists in a space depicted in the image.

Additionally, according to the present invention, the two or more projection devices, which project images on the plurality of projection surfaces, are integratedly managed and synchronized by a management device, and thus a synchronized and unified image can be reproduced on the entire projection surface.

Moreover, the present invention can effectively manage the lamps or cooling fans included in two or more projection devices. In detail, when two or more projection devices are installed in a single theater, the replacement times of the lamps or cooling fans included in the two or more projection devices are different, which makes it difficult to manage. However, the present invention can inform the replacement times of these lamps or cooling fans in advance, thus resolving the difficulty in management.

Furthermore, the present invention can perform both the image correction based on the performances of the projection devices and the image correction based on the properties of the projection surfaces at the same time. Thus, it is possible to further increase the unity of images projected on the plurality of projection surfaces by the two-phase image correction.

In addition, the present invention can detect an involuntary change in position of each projection device and, if the involuntary change in position is detected, inform the change in the position or return it to its original position by remote control.

Thus, even if the position of each projection device is unexpectedly changed by a change in environment of the theater, it is possible to inform or correct the change, thus preventing deterioration of image quality due to the change in the position of the projection device.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A projection device management system comprising:
   two or more projection devices which project images on a projection surface; and
   a management device which corrects the image projected by each projection device based on information on each projection device and manages information for maintenance of each projection device,
   wherein the two or more projection devices are installed in the same theater,
   wherein the information for maintenance includes brightness information of the lamp installed in each projection device, and
   wherein the management device generates replacement guide information if the difference in brightness between the lamps included in the two or more projection devices is greater than a reference value and the replacement guide information includes identification information of the projection device which needs to replace the lamp.

2. The projection device management system of claim 1, wherein the two or more projection devices project images on a plurality of projection surfaces arranged so as not to be parallel to each other.

3. The projection device management system of claim 2, wherein the two or more projection devices project images which are synchronized with each other.

4. The projection device management system of claim 3, wherein the management device corrects the image projected by each projection device based on a difference in performance between the two or more projection devices.

5. The projection device management system of claim 4, wherein the management device corrects the image to be projected by each projection device based on a difference in brightness, difference in contrast, difference in resolution, or difference in physical position between the two or more projection devices.

6. The projection device management system of claim 4, wherein the management device corrects the image to be projected by each projection device based also on information on the plurality of projection surfaces.

7. The projection device management system of claim 3, wherein the management device corrects the image to be projected by each projection device based on the properties of the plurality of projection surfaces and controls the two or more projection devices to project images of the same brightness.

8. The projection device management system of claim 7, wherein each projection device includes a lamp and the management device controls the operation of the lamps included in the two or more projection devices and equally maintains the brightness of the lamps.

9. The projection device management system of claim 1, wherein the information for maintenance includes operation time information of a lamp or cooling fan installed in each projection device.

10. The projection device management system of claim 9, wherein a current detection device is provided in the lamp or cooling fan and the management device obtains the operation time information of the lamp or cooling fan based on information collected by the current detection device.

11. The projection device management system of claim 9, wherein the management device generates replacement guide information if the operation time of the lamp or cooling fan is greater than a reference value and the replacement guide information includes identification information of the projection device which needs to replace the lamp.

12. The projection device management, system of claim 1, wherein the management device generates replacement guide information if the brightness of the lamp is less than a reference value or if the brightness of the lamp is not maintained constant over time and the replacement guide information includes identification information of the projection device which needs to replace the lamp.

13. The projection device management system of claim 1, wherein the information for maintenance includes position information of each projection device.

14. The projection device management system of claim 13, wherein a position detection device is provided in each projection device and the management device obtains the position information of each projection device based on information collected by the position detection device.

15. The projection device management system of claim 14, wherein the management device generates, if the position of a specific projection device is changed, information for informing the corresponding event, and the information includes identification information of the projection device whose position is changed.

16. The projection device management system of claim 1, wherein each projection device detects internal temperature or humidity and, if the temperature or humidity of a specific projection device is greater than a reference value, the management device stops the operation of the corresponding projection device.

17. A projection device management system comprising:
two or more projection devices which project images on a projection surface; and
a management device which corrects the image projected by each projection device based on information on each projection device and manages information for maintenance of each projection device,
wherein the two or more projection devices are installed in the same theater,
wherein the management device comprises:
an image correction unit which corrects the image projected by each projection device based on the information on each projection device; and
a maintenance management unit which generally manages the information for maintenance of each projection device, and
wherein the projection device comprises:
a current detection unit which detects the current flowing in a lamp or cooling fan;
a brightness detection unit which detects the brightness of the lamp;
a position detection unit which detects the position of the projection device;
a temperature detection unit which detects the temperature of the inside of the projection device; and
a humidity detection unit which detects the humidity of the inside of the projection device.

* * * * *